Figure 1:
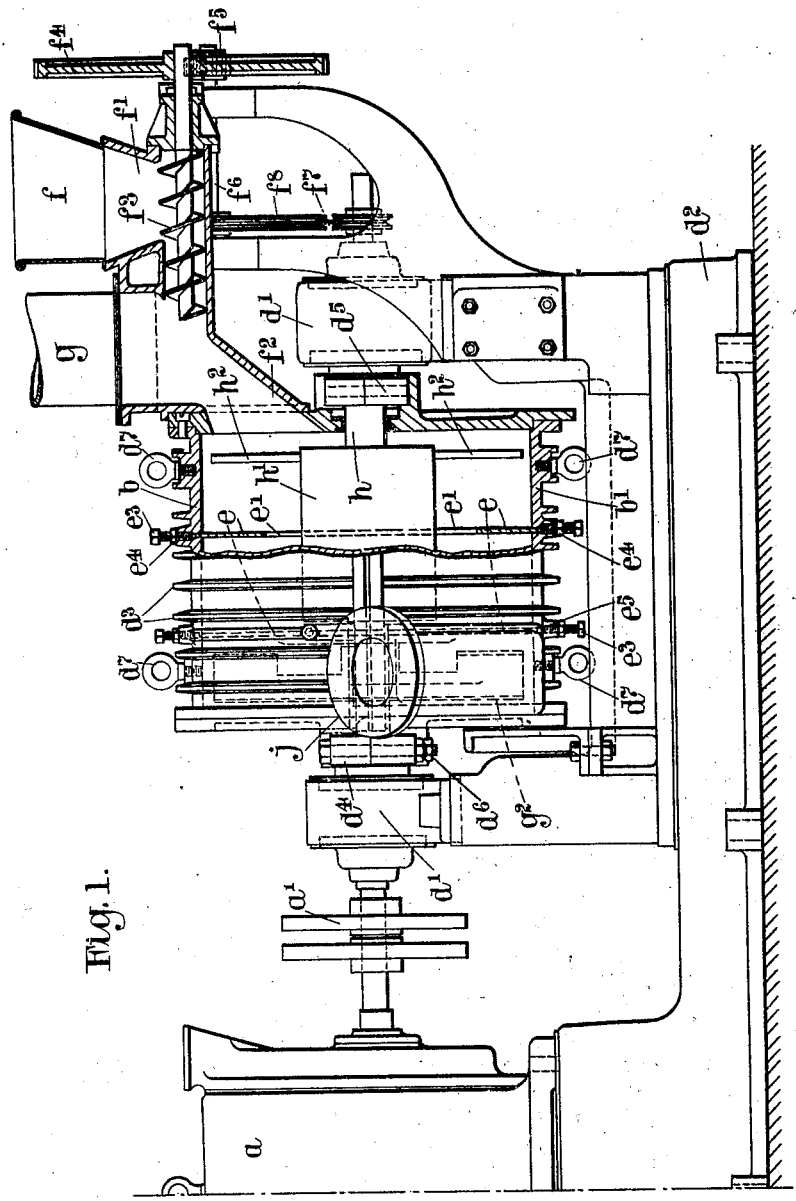

March 23, 1926.
W. E. PRESCOTT
1,577,492
DISINTEGRATOR FOR PULVERIZING SUGAR AND OTHER FRIABLE SUBSTANCES
Filed July 3, 1924
3 Sheets-Sheet 1

INVENTOR:
WILLIAM EDWARD PRESCOTT
ATTORNEY:

March 23, 1926. 1,577,492
W. E. PRESCOTT
DISINTEGRATOR FOR PULVERIZING SUGAR AND OTHER FRIABLE SUBSTANCES
Filed July 3, 1924 3 Sheets-Sheet 2
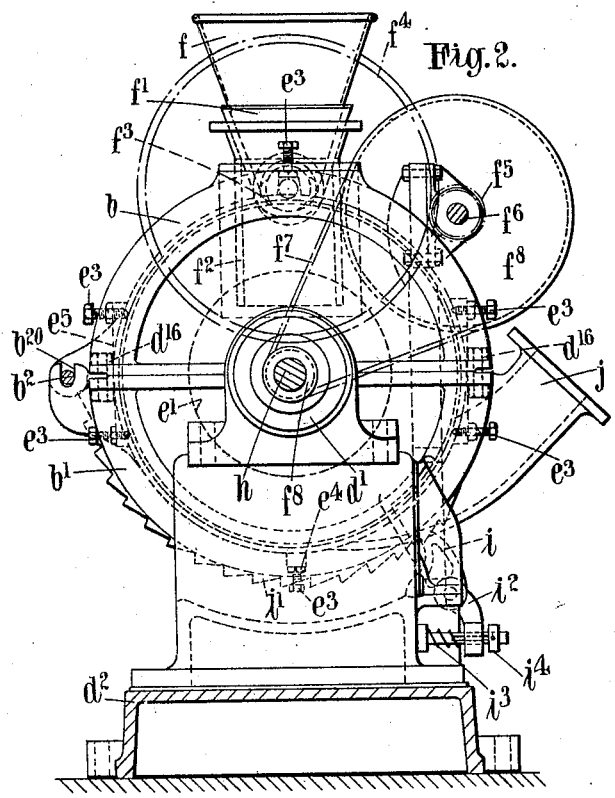
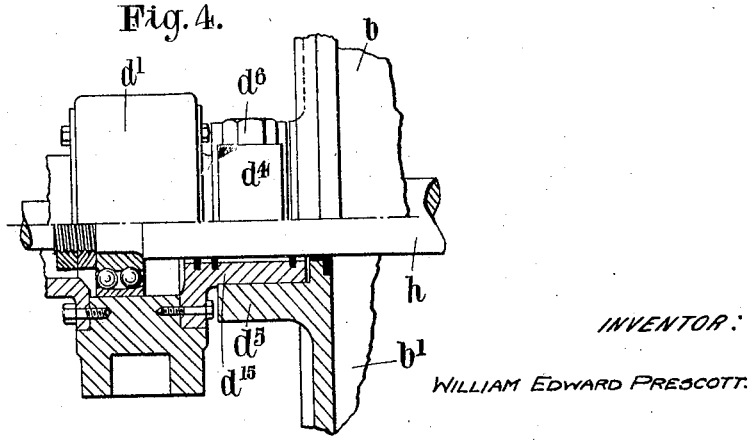
INVENTOR:
WILLIAM EDWARD PRESCOTT.
ATTORNEY:

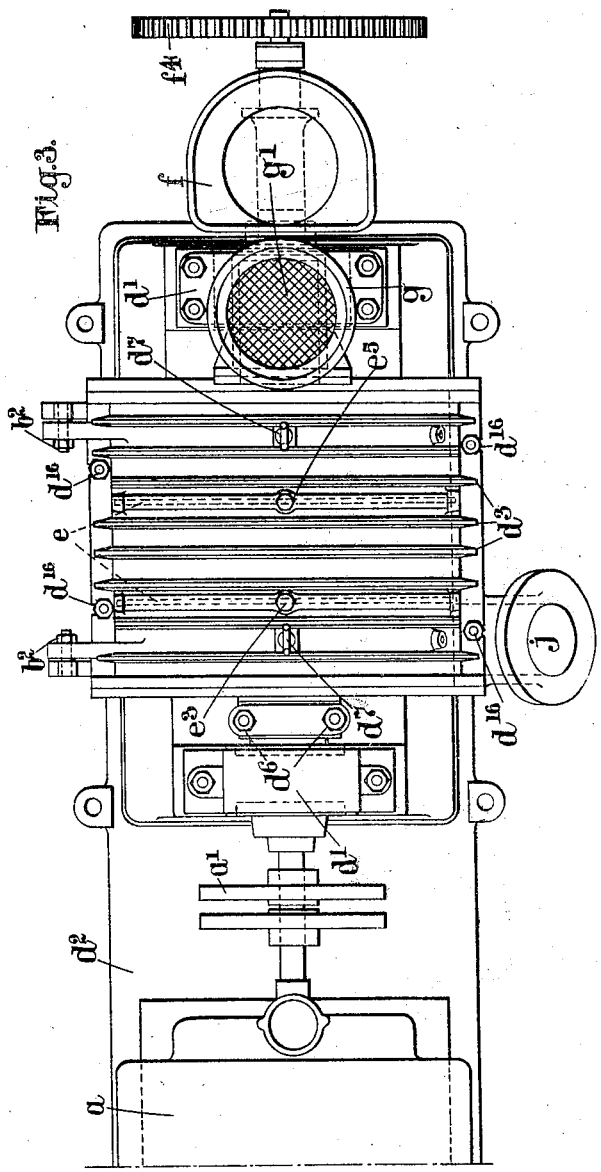

Patented Mar. 23, 1926.

1,577,492

UNITED STATES PATENT OFFICE.

WILLIAM EDWARD PRESCOTT, OF LONDON, ENGLAND, ASSIGNOR TO BAKER-PERKINS COMPANY INCORPORATED, OF WHITE PLAINS, NEW YORK, A CORPORATION OF NEW YORK.

DISINTEGRATOR FOR PULVERIZING SUGAR AND OTHER FRIABLE SUBSTANCES.

Application filed July 3, 1924. Serial No. 723,928.

*To all whom it may concern:*

Be it known that I, WILLIAM EDWARD PRESCOTT, a subject of the King of Great Britain and Ireland, residing at London, England, have invented certain new and useful Improvements in Disintegrators for Pulverizing Sugar and Other Friable Substances, of which the following is a specification.

This invention relates to disintegrators for pulverizing friable substances, particularly sugar, said disintegrators being of the type which embody a non-rotatable casing having baffles extending inward from the periphery and in which rotate beating or disintegrating members which act on the material under treatment to pulverize same. A fan, blower or equivalent may also be provided at one end of the casing to force or suck the pulverized material away.

It has been found in practice that with the disintegrators as hitherto constructed the material under treatment and particularly so in the case of sugar has a tendency to clog or accumulate in different parts of the casing especially on the baffles mentioned and the primary object of the present invention is to provide a structure in which this disadvantage is reduced to a minimum or if it occurs in which such accumulated material can be readily removed.

The invention in its broadest aspect provides an improved form of casing for a disintegrator of the type mentioned and consisting of relatively movable or separable sections, and detachably mounted baffles carried by said casing and consisting of separate elements each pertaining to the respective casing sections.

The invention further comprises novel means for mounting the casing sections so that they can be rotatable or removable for facilitating access to the interior and to other details of construction, arrangement and combinations of parts of the disintegrator generally as set forth in appended claims and hereinafter described with reference to the accompanying drawings in which:—

Fig. 1 is a side elevation of the disintegrator with parts in section. Fig. 2 is a sectional end elevation of Fig. 1 from the left, Fig. 3 is a plan view, and Fig. 4 is a detail view of the casing mounting.

The apparatus is shown in the drawings as driven from an electric motor $a$ through suitable couplings $a^1$ to the shaft $h$ of the beaters, but it can be driven from any other prime mover according to requirements.

The apparatus comprises a cylindrical casing formed in two halves or sections, viz an upper section $b$ and a lower section $b^1$. The upper section is mounted on the lower section by means of hinges or pivots $b^2$ so that it may be rotated about said hinges or pivots or entirely removed from the lower section to disclose the interior mechanism for cleaning, inspection or other purposes.

The casing as a whole is carried by means of trunnions $d^5$ Fig. 4 engaged by bosses $d^{15}$ projecting from bearings $d^1$ extending from the base casting $d^2$ and caps $d^4$ secured to the trunnions by means of bolts $d^6$ holds the casing in position. The end plates of the upper section $b$ are not journalled at the ends this section resting on the lower section and being secured by bolts $d^{16}$. The exterior of the casing is shown as provided with gills or vanes $d^3$ for air cooling purposes. Each section of the casing is also provided with eye bolts $d^7$ for attachment of lifting tackle.

Within the casing is a number of baffles each formed of two annular plates $e$ joined or meeting at the transverse centre and having a central hole $c^1$ therethrough, said baffles being detachably mounted in the casing by their edges each engaging an annular groove formed in or through the casing wall and held in said groove by means of screws $e^3$ and lock nuts $e^4$, the screws passing through thickened parts $e^5$ of the casing wall and acting on the edges of the plates within the grooves.

The upper section of the casing is provided at one end with a feed opening $f$ with which communicates a hopper $f^1$ into which the material to be pulverized is deposited and from which it is moved down an incline $f^2$ by means of a worm or screw $f^3$ shown as driven by intermeshing gear wheel $f^4$ and pinion $f^5$, the latter being mounted on a shaft $f^6$ driven from the beater shaft $h$ by means of pulley and belt gear $f^7$, $f^8$.

Also communicating with the feed opening $f$ is a pipe or trunk $g$ shown as provided with a wire gauze sieve or screen $g^1$ and providing an inlet for air which is sucked through the casing by a fan $g^2$ at the discharge end mounted on the beater shaft $h$.

The beater shaft $h$ above mentioned carries within the casing a drum $h^1$ provided with any suitable form of beater arms $h^2$ which operate between the baffles $e$ above mentioned. The said beater arms in their rotation thoroughly pulverize the material which is discharged by the current of air through the outlet $j$ leading off from the bottom of the lower casing member $b^1$ at one side thereof.

When it is desired to have access to the interior of the apparatus, the bolts $d^{16}$ are slacked off or removed and the upper casing section together with the hopper $f^1$, air inlet $g$ and associated parts can be swung back about the hinges $b^2$ or entirely removed by reason of the open ended slots $b^{20}$ of said hinges as shown in Fig. 2, but before doing so it is necessary to remove the belt $f^7$ from one or other of its pulleys $f^8$. When the casing sections have been thus separated the baffles $e$, can be removed from their slots in the casing wall. Should it be desired to have more convenient access to the lower casing section $b^1$ this can be turned around the beater shaft and prevented from falling back at its different positions of rotation, by means of a pawl $i$ which engages a ratchet $i^1$ formed on the periphery of said section or when turned sufficiently the said lower section can be entirely removed as by lifting tackle applied to the eye bolts $d^7$, after having removed the bearing caps $d^4$. The pawl $i$ has a tail $i^2$ under action of a spring $i^3$ and a catch $i^4$ is provided by turning which the pawl can be put out of action if desired.

The construction above described permits the interior of the casing sections and the baffles to be easily machined or otherwise treated to render their surfaces smooth and thus minimize the clogging effect of the material under treatment (it being customary to make the casing of cast metal) and at the same time renders the removal and replacement of the baffles for cleaning them and the interior of the casing a very simple matter.

In the improved structure also it is contemplated making the baffles of a material which can be easily polished, such as mild steel plate, thus further reducing the tendency for the material to clog thereon.

From Figs. 1 and 2 of the drawings it will be observed that the base $d^2$ on which the apparatus is carried is separate from the casing sections $b$ $b^1$ as distinct from the customary procedure of making them as an integral casting. By this means a current of air may pass around the entire casing whereby equal temperature all round same is assured, this desirable effect being further enhanced by making the walls of the casing of generally equal thickness or weight throughout. The cooling effect may be still further improved by the provision of the gills or vanes $d^3$ above referred to.

What I claim as my invention and desire to secure by Letters Patent of the United States is:—

1. In a disintegrator the combination of a casing comprising relatively movable sections hinged together about a longitudinal axis, a feed hopper carried by one of said sections, means whereby the sections may be detached one from the other, a series of interior baffles carried by said casing sections and comprising separate elements each pertaining to the respective sections, rotary beaters mounted within the casing between the aforesaid baffles, a discharge outlet carried by another of said casing sections, means whereby said latter section can be rotated about the axis of the beaters, means whereby said last mentioned casing section can be held in various positions of rotation.

2. In a disintegrator a supporting base, a casing comprising two relatively hinged sections, divided upon a longitudinal axis and supported by said base, means whereby one section may be hinged in relation to the other and completely detached therefrom, and means for mounting the second section whereby it may be rotated about the aforesaid axis and completely removed from the base.

3. In a disintegrator, a casing comprising two relatively hinged sections, divided upon a longitudinal axis, means whereby one section may be hinged in relation to the other and completely detached therefrom, interior baffles detachably carried by the casing sections and consisting of separate members each pertaining to the respective sections, rotary beaters mounted within the casing between said baffles, and means for mounting the second section whereby it may be rotated about the aforesaid axis and completely removed from the said beaters.

4. In a machine of the class set forth, a cylinder divided longitudinally into two sections, means whereby said sections are detachably connected together, said means permitting complete removal of one of the sections, means for supporting the other of said sections in a manner to permit tilting thereof, and means for maintaining said last-mentioned section in a tilted position.

5. In a machine of the class set forth, a normally immovable cylinder, means for supporting said cylinder in a manner to permit tilting thereof, and means for maintaining the cylinder in tilted position.

6. In a machine of the class set forth, a suitable support, and a cylinder mounted in said support, said cylinder comprising a plurality of sections, means for securing said sections together and permitting of removal of one of the sections, and means for permitting of removal of the other of the sections relative to the support.

7. In a machine of the class set forth, a suitable support, and a cylinder carried by said support, said cylinder comprising two sections one of which is removable with respect to the other section, said other section being removable with respect to said support.

8. In a machine of the class set forth, a cylinder comprising two members detachably secured together, the joint between the sections occupying a normal horizontal plane, and means for maintaining said cylinder with the joint between the sections inclined with respect to the horizontal plane to facilitate removal of one of the sections.

9. In a cylinder for disintegrating machines, a plurality of sections, means for securing said sections together, a plurality of circumferentially extending channels formed on the inner face of each of said cylinder sections, and baffles mounted in the channels of each member, said baffles comprising semi-circular members received in the channels of their respective members and retained therein by the position of said members when secured together.

10. In a machine of the class set forth, a two-part cylinder, baffles in the form of semi-circular members placed end to end to provide complete circular members of a greater diameter than the internal diameter of the cylinder, and channels formed in the inner face of the parts of the cylinder for receiving the baffles and preventing displacement thereof when the parts of the cylinder are secured together.

11. In a disintegrator, a casing comprising two relatively hinged sections, each having walls of substantially the same thickness throughout and divided upon a longitudinal axis, means whereby one section may be completely detached from the other section, interior baffles detachably carried by the casing sections and consisting of separate members each pertaining to its respective section, rotary beaters mounted within the casing between said baffles, means for mounting the second section, whereby it may be rotated about the aforesaid axis and completely removed from said beaters, and a base on which the casing is mounted, said casing and base being separated to provide an air space about the entire exterior of the casing.

12. In a disintegrator, the combination of a casing comprising relatively movable upper and lower sections hinged together about a longitudinal axis, means whereby the upper section may be detached from the lower section, a series of interior baffles carried by said casing sections, and comprising separate elements each pertaining to the respective sections, rotary beaters mounted within the casing between the aforesaid baffles, means whereby the lower section can be rotated about the axis of the beaters, and means whereby said last-mentioned section can be held in various positions of rotation.

In witness whereof I have signed this specification.

WILLIAM EDWARD PRESCOTT.